United States Patent
Ohrem et al.

(10) Patent No.: US 10,590,816 B2
(45) Date of Patent: Mar. 17, 2020

(54) ROLLED FIN SPIRAL EGR COOLER

(71) Applicant: Hanon Systems, Daejeon (KR)

(72) Inventors: Carsten Ohrem, Bergheim (DE); Peter Diehl, Köln (DE); Petr Sispera, Uhersky Ostroh (CZ)

(73) Assignee: HANON SYSTEMS, Daejeon (KR)

( * ) Notice: Subject to any disclaimer, the term of this patent is extended or adjusted under 35 U.S.C. 154(b) by 262 days.

(21) Appl. No.: 15/441,836

(22) Filed: Feb. 24, 2017

(65) Prior Publication Data
US 2017/0248050 A1     Aug. 31, 2017

(30) Foreign Application Priority Data
Feb. 26, 2016   (DE) .................. 10 2016 103 458

(51) Int. Cl.
   F28D 7/02     (2006.01)
   F01N 3/04     (2006.01)
   F01N 3/02     (2006.01)

(52) U.S. Cl.
   CPC .......... F01N 3/043 (2013.01); F01N 3/02 (2013.01); F01N 3/0205 (2013.01); F01N 2240/02 (2013.01); F05D 2260/221 (2013.01); Y02T 10/20 (2013.01)

(58) Field of Classification Search
   CPC .......... F01N 3/043; F01N 3/02; F01N 3/0205; F01N 2240/02; F05D 2260/221; Y02T 10/20
   USPC .................. 165/8, 10, 41, 51, 52, 66, 88, 89
   See application file for complete search history.

(56) References Cited

U.S. PATENT DOCUMENTS

| 6,289,978 | B1 * | 9/2001 | Antoine ............... F28D 9/0018 165/164 |
| 2005/0133202 | A1 * | 6/2005 | Jorgensen ............ F28D 7/024 165/103 |
| 2011/0223067 | A1 | 9/2011 | Bucknell |
| 2015/0165573 | A1 | 6/2015 | Greber |
| 2015/0323260 | A1 * | 11/2015 | Greber ................ F28D 9/0068 165/164 |

FOREIGN PATENT DOCUMENTS

| CN | 102809313 A | 12/2012 |
| DE | 102012106079 A1 | 1/2014 |
| EP | 1852585 A1 | 11/2007 |
| EP | 2251630 A1 | 11/2010 |
| JP | 2001221581 A | 8/2001 |
| KR | 900001486 Y1 | 2/1990 |
| KR | 20130065389 A | 6/2013 |
| KR | 20150127549 A | 11/2015 |
| KR | 20150127552 A | 11/2015 |

* cited by examiner

*Primary Examiner* — Henry T Crenshaw
*Assistant Examiner* — Kamran Tavakoldavani
(74) *Attorney, Agent, or Firm* — Shumaker, Loop & Kendrick, LLP; James D. Miller

(57) ABSTRACT

A coiling heat exchanger, characterized by a heat exchanger spiral consisting of a liquid shield with fins, whereby neighboring coils of the spiral of the liquid shield are spaced apart from one another by the fins and connected to one another in a heat exchanging manner and that the liquid shield is perfused by liquid, whereby gas flows between the neighboring coils of the spiral of the liquid shield along the coiling axis.

10 Claims, 3 Drawing Sheets

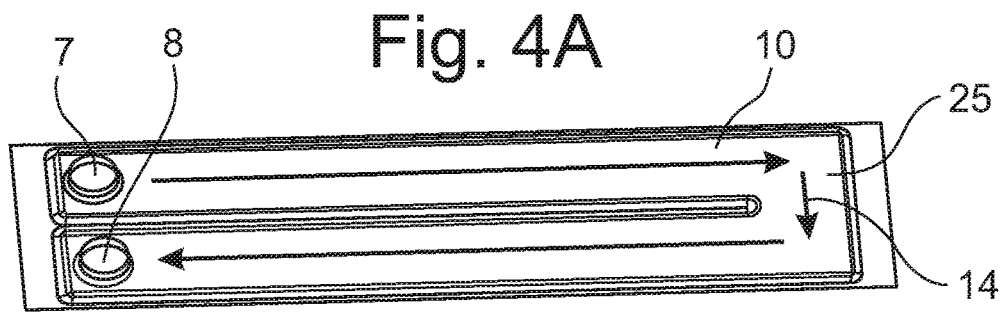
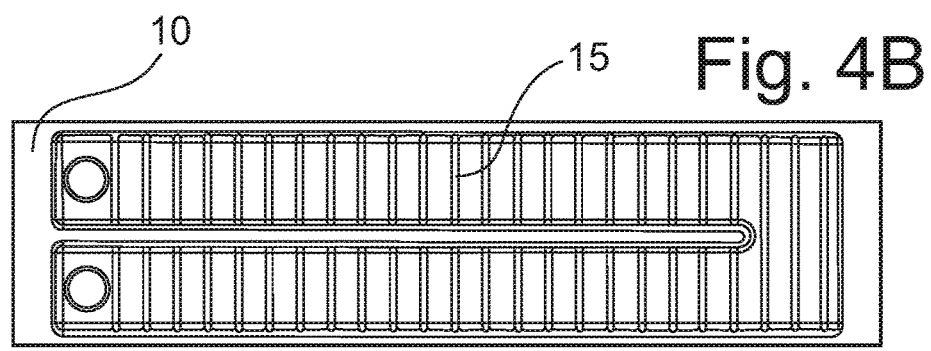
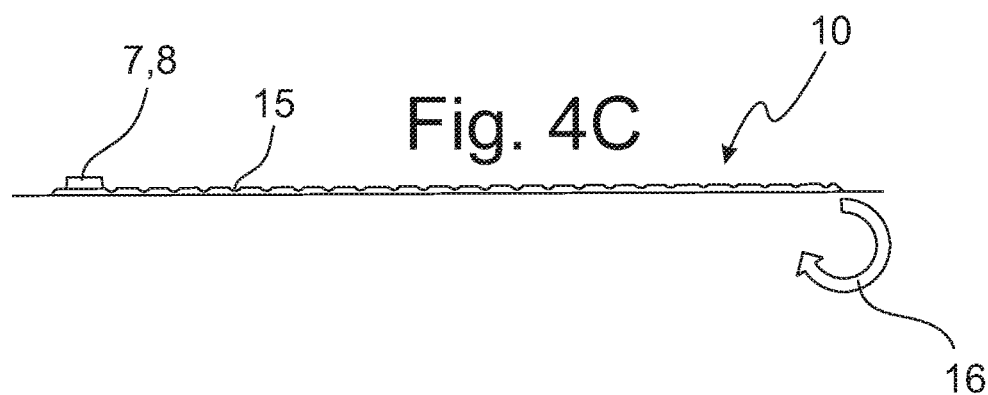
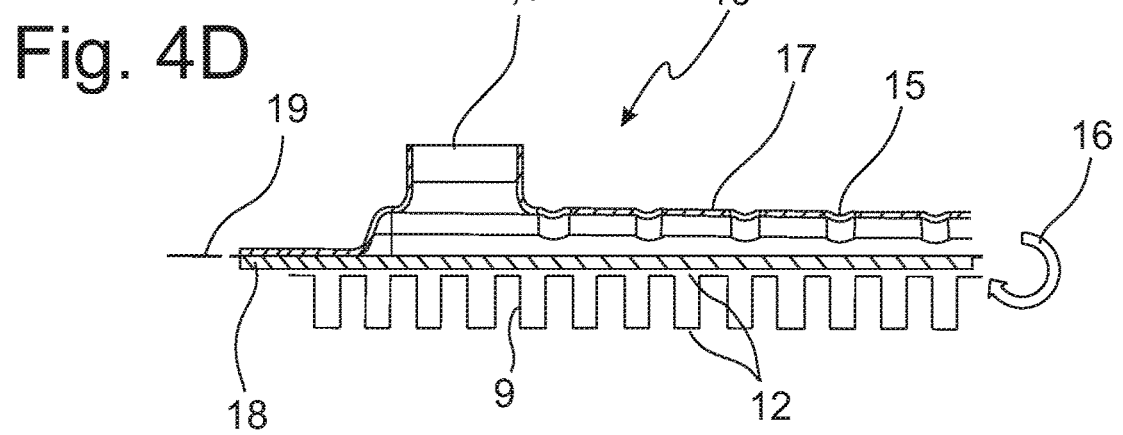

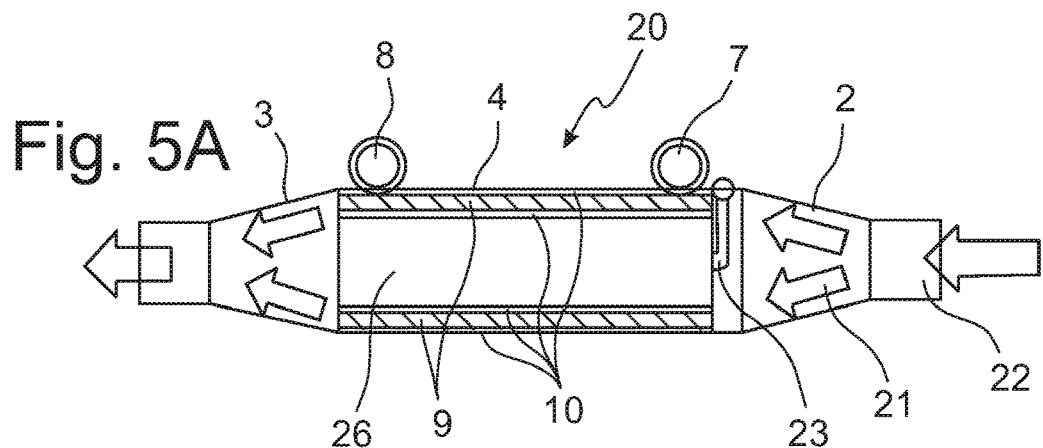
Fig. 5A
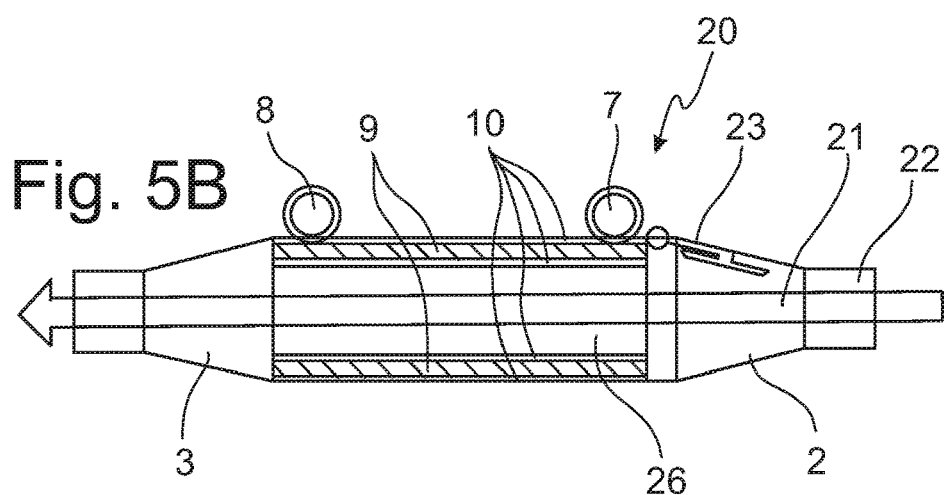
Fig. 5B
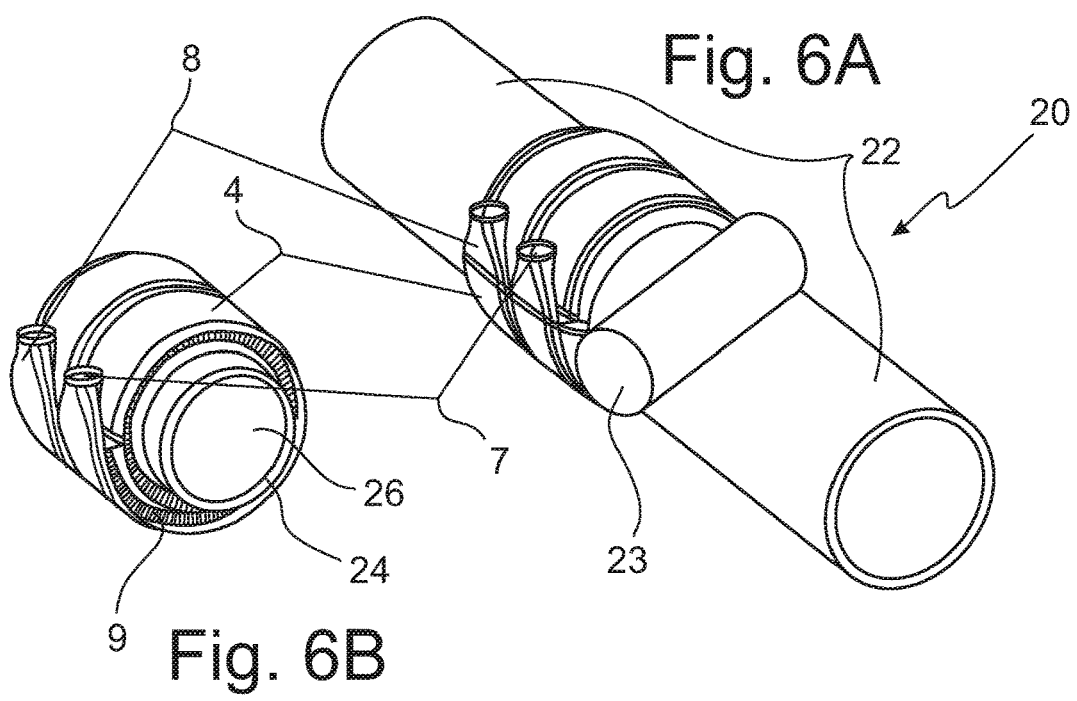
Fig. 6A
Fig. 6B

ROLLED FIN SPIRAL EGR COOLER

CROSS REFERENCE TO RELATED PATENT APPLICATION

This application claims priority to German Patent Application No. 10 2016 103458.4 filed on Feb. 26, 2016, the disclosure of which is incorporated herein by reference in its entirety.

FIELD

The invention relates to a coiling heat exchanger which is, in particular, suitable for use as an exhaust gas heat exchanger in conjunction with internal combustion engines in motor vehicles.

BACKGROUND

So as to comply with the strict current legal guidelines and emission regulations, the exhaust gas of internal combustion engines of motor vehicles must be specially handled during emission. As an example, the exhaust is removed from the exhaust gas system, cooled down and once again fed back for new combustion. The heat exchangers for the thermal treatment of the exhaust gas, in particular for the cooling of the exhaust gas, are also indicated as exhaust gas heat exchangers.

In the state of the art, finned heat exchangers are employed as exhaust gas heat exchangers, which are perfused by exhaust gas and coolant. Cooling water is predominantly used for the cooling of the exhaust gas flow.

Exhaust gas heat exchangers according to the state of the art feature fins that are embossed or reshaped from sheet metal, which are inserted in a sheet metal housing and which are welded to the same. The exhaust gas perfuses the inside of the housing with the fins and exchanges the heat through the fins to the housing, and the coolant flows along the outside of the housing and absorbs the heat from the exhaust gas flow. One or a multitude of these housings one on top of the other form the so-called radiator core, which is surrounded by an outer housing for the cooling water flow.

This is furthermore a differentiation of heat exchangers depending on the type of direction of the exhaust gas flow. Therefore, as an example, I-throughputs, U-throughputs and S-throughputs are known in exhaust gas coolers Moreover, in the state of the art, exhaust gas heat exchangers are known that do not feature the aforementioned rectangular cross section, but rather a round cross section. Shell and tube heat exchangers are employed as exhaust gas heat exchangers with a round cross section.

The use of a round exhaust gas heat exchanger is, for example, desirable when connecting the exhaust gas heat exchanger to a diesel particulate filter.

The heat exchanger tubes, which feature either a round or an oval/rectangular cross section and are sufficiently smaller in dimension when compared to the housing, can be arranged in such a way that the cooler cross section can be fully exploited and a larger exchange surface can be achieved.

There are also spiral heat exchangers that are known in the state of the art, which are likewise commonly employed for heat exchange between liquids.

Spiral heat exchangers comprise two flow channels, which are separated by a wall. This wall is rolled up, according to which the heat exchanger respectively features both an entrance and outlet in the outer housing as well as in the inner core. Normally, spiral heat exchangers are built up using the countercurrent principle. The one medium flows from the outside to the inside in a spiral shape, whereas the second medium flows countercurrent from the inside to the outside.

A spiral heat exchanger of the aforementioned type results, for example, from EP 1214558 B1.

A spiral heat exchanger is moreover known from EP 2251630 B1, which features a spiral body that is made up of at least two spiral metal sheets, which are coiled to create the spiral body. The means of manufacture of this type of spiral heat exchanger occurs through coiling. On the basis of the fashion of manufacturing of this type of heat exchanger, these are also defined as coiling heat exchangers.

The multitude of requirements asked of exhaust gas heat exchangers are still not fully satisfied by the state of the art.

If one of the specifications for an exhaust gas heat exchanger is the need for a round cross section, then the current state of the art using a shell and tube heat exchanger is not ideal. Shell and tube heat exchangers have a limited heat exchanging surface. The possible exchange performance when related to the volume, in particular when related to the installation space, is frequently not sufficient.

From this point of view, the concept of a finned heat exchanger is to be preferred. The same offers a large heat exchanger surface in relation to the volume. A disadvantage is, however, the exploitation of the cooling cross section. To be able to make good use of the cooling cross section, it would be necessary to employ rib channels of varying widths, which would lead to a large number of different components in the manufacture of the heat exchanger. This concept thereby leads to a large technical manufacturing expense, as regards the production and logistics for the components. This correspondingly has a negative impact on the costs.

The use of a standardized channel width would reduce the number of different components to the customary scope, however the exploitation of the cross sectional surface would still be very poor and even worse than in a shell and tube concept. Furthermore, an appropriate coolant flow would be difficult or impossible to achieve in this concept.

The spiral cooler concept would in principle supply a good exploitation of the cross section, however, the use of fins in the gas flow is very difficult to accomplish. Beyond this, there is also a problem with the loss in gas-side pressure. The gas flow cross section is small in relation to the cooling volume and the flow length very large. A further disadvantage consists in the position of the water-gas connections, which do not correspond with generally preferred connections. A spiral heat exchanger is thereby preferred when using the same media, in particular when exchanging heat from liquid to liquid.

An exhaust gas heat exchanger in a coiled execution results from US 2011/0223067 A1.The exhaust gas heat exchanger features tubes laid out in a meandering shape, which are connected to ribs that are transverse to the longitudinal axis. The tubes are then coiled, which results in the heat exchanger package. A disadvantage to this concept is the realization of the thermal distribution, which is only unsatisfactorily solved through the point-shaped contacts between the ribs and the tubes.

SUMMARY

The purpose of the invention thereby consists in realizing an increase in the heat exchange performance of exhaust gas heat exchangers applied to a round cross section and to improve the gas-side heat exchange.

The purpose is fulfilled through the object as shown and described herein.

The purpose is in particular solved by a coiling heat exchanger that is laid out as a heat exchanger spiral made up of a liquid shield with fins, whereby neighboring coils of the spirals of the liquid shield are spaced apart from one another and linked together for heat conduction. The liquid shield is perfused by liquid, whereby the gas between the neighboring coils of the spirals of the liquid shield flows longitudinally to the flow of the coolant, along the coiling axis of the coiling heat exchanger.

The liquid shield of the coiling heat exchanger is made up of an upper metal sheet and a lower metal sheet, whereby the metal sheets that are arranged opposite to one another and separated from one another are connected to one another at least in the edge areas and thereby create a space between the metal sheets that can be perfused by liquid.

Further, the fins are laid out only on one side of the liquid shield, either on the upper or under side.

According to a particular embodiment of the invention, the fins are realized in finned sheet metal, whereby the finned sheet metal is connected on at least one side of the liquid shield for heat conduction.

The liquid shield advantageously features a liquid inlet and a liquid outlet, through which a liquid flow path runs in a spiral shape towards the inside and following a redirect runs in a spiral shape outwards.

The liquid inlet and the liquid outlet are arranged on one side and a redirect area is arranged on the other side of the liquid shield, whereby the liquid flow paths are arranged in a neighboring manner and in opposing directions.

An advantageous construction embodiment of the liquid shield consists in the same, when in a still not coiled condition, features pre-punched areas on at least one side outside of the bending plane, which creates a reserve length of the sheet metal for the coiling of the heat exchanger spiral. When speaking of pre-punched areas, one should understand deformations of the sheet metal, which lead to a reserve length of the sheet metal. This reserve length is released by a mechanical tensile load, which occurs, for example, during coiling about an axis outside of the plane of the sheet metal and the sheet metal is smoothed out.

The heat exchanger spiral of the coiling heat exchanger may be laid out as an Archimedes spiral, whereby in the center of the spiral a cylinder-shaped flow-through cross-section is created.

According to a further advantageous embodiment of the invention, the cylinder-shaped flow-through cross section is laid out with a valve in the center of the spiral, so that, when the cylinder-shaped flow-through cross section is closed off, the flow-through of the gas is forced to bypass in a radial direction through an externally connected finned area of the coiling heat exchanger, whereas in the case of an open valve, due to the limited loss in pressure, the gas predominantly flows in the cylinder-shaped flow-through cross section and the coiling exchange portion is either not at all or only minimally perfused due to the higher flow resistance brought about by the fins.

An alternative embodiment consists in the heat exchanger spiral being laid out as an Archimedes spiral that has a centrally starting origin, so that no cylinder-shaped flow-through cross section is created in the inside and, given the lack of a bypass possibility, the gas is obliged to flow through the entire cross section that is formed by the spiral, through the intermediate spaces with the fins of the coiling heat exchanger that are created by the coiling of the liquid shield.

It is thereby advantageous that the area of the origination of the spiral in the center which is not filled with fins is closed with a sealing cap, to prevent undesirable short-circuit flows.

A method for the manufacture of a coiling heat exchanger of the previously described type is in particular characterized by the fact that a rectangular liquid shield is coiled along one of its sides in the roll-up direction with the side being the coiling axis, whereby one side of the liquid shield lies in the bending plane and the other side is stretched outside of the bending plane, and the reserve lengths of the pre-punched areas are thereby released during the coiling process.

The use of a coiling heat exchanger of the previously described type typically takes place as an exhaust gas heat exchanger in conjunction with internal combustion engines for use in motor vehicles.

Hereinafter, the conception of the invention will be described in greater detail on the basis of examples.

One embodiment of the invention consists of a rolled up finned heat exchanger that is characterized by the fact that it is cross perfused. The coolant, in particular the cooling water, enters the outer shell in the cooling jacket, flows in spiral motion into the inside of the cooler to the origin of the spiral, from there it flows parallel to the longitudinal axis of the cooler, which is also the coiling axis, into the outflowing cooling channel and then in a spiral shape back to the outer shell of the cooler, where it then escapes. The gas that is to be cooled perfuses the cooler parallel to the longitudinal axis, which is also indicated as the coiling axis, which is to say transverse to the spiral shaped coolant flow. The cooler is thus built up as follows: the liquid shield preferably consists of an embossed metal sheet and a planar metal sheet, whereby two embossed metal sheets can be used. The metal sheets are preferentially connected to one another by means of a laser weld or are tacked to one another and later soldered, and create one intermediate space, the coolant channel. A finned sheet metal is preferentially fixed to a coolant channel with a layer of brazing solder on the upper or under side, or with soldering paste. These coated components are rolled up, whereby the cooler core, heat exchanger spiral, is produced. A cover plate may be necessary depending on the design or alternatively the final geometry of the cooling water spouts. It is furthermore useful to place a sealing cap in the inside outlet of the cooler, so as to, there, prevent the flow of the exhaust gas in a zone without the fins, which is created at the origin of the spiral.

So as to better exploit the center of the heat exchangers, the area of origin of the spiral, in an alternative the lower metal sheet is deformed at the end. The coolant channel is expanded at the origin so as to reduce the unfinned area and eventually allow for the sealing cap to be totally omitted. In so doing, the fins can then reach further into the center and there results a larger cross section for the coolant redirect area.

The cooler is further completed with an inlet funnel and an outlet funnel or alternatively other desired elements, such as, for example, brackets and the like. All connection points are prepped with soldering paste or alternatively with soldering film and soldered.

The coiling method, in particular, consists of the production of the coiled cooler core. So as to not disturb or alternatively to displace the coated components, it is advisable to specify a suitable neutral bending grain and therefore a so-called bending plane in the length that preferentially is in the connection seam of the water jacket, so that no shear stresses occur following the folding. This is an important point, to ensure the leakproofness of the coolant. The further away that the material is from the neutral folding line, the higher the stresses are that occur during coiling. It is the metal sheet that is not in the bending plane, which must be stretched on the outer side that is therefore critical. For this reason, it is advantageous that this metal sheet that is not in the bending plane is supplied at suitable distances with suitable pre-punched areas, which correlate in depth and distance with the subsequent bending radius. These pre-punched areas are flattened out during the rolling up and the coolant jacket is smooth on both sides in rolled up state. The finned sheet metal, preferentially a corrugated sheet metal, has limited resistance to bending with respect to the roll-up direction and slides and moves into position.

As regards the fins, the heat exchanger is soldered on the upper and lower side for the purpose of heat exchange. The fin is placed in a housing, which has previously been coated with soldering paste or upon which respectively a soldering film has been applied. This assembly is fixed in place with welding points. The complete cooler assembly that has been prepped and fixed in place with solder is then completely soldered in a soldering operation. In so doing, a soldered connection to the liquid shield results through the soldering paste or soldering film on top or on the bottom of the fin.

The liquid shield is completely welded at the contact points of the two metal sheets, whereby the separation of the forward and return flow takes place through the welding from above through the material of the one metal sheet. Alternatively, the metal sheets are prepped with sufficient solder and rolled up in an adequately fixed manner and the leakproof connection then occurs in the soldering process.

As regards the positional variation of the individual layers of the assembly during the coiling process, the shifting, it should be noted that a different rolled up length will result depending on the distance to the neutral folding grain, on the basis of a different radius. In the rolled-up state, the fin thereby features a different length than the liquid shield. This difference in length is then equalized in the coiling process. As a consequence, the individual layers can therefore only be fixed in the center of the coil, the point of origin of the spiral, prior to the coiling process. This also applies to the soldering films, inasmuch as the same are employed.

According to an embodiment, the liquid shield is considered as a layer and is completely welded prior to the coiling process and is adapted to the variations in length with the pre-punched areas. As an alternative, the liquid shield can be rolled-up out of the two metal sheets and subsequently soldered.

A further realization of the concept of the coiling heat exchanger, according to the invention, is a heat recovery system in the exhaust gas system. According to the state of the art, a heat exchanger is foreseen that runs parallel to the exhaust gas system that can selectively be perfused. A valve switches the flow of the quantity of exhaust gas in such a manner that either the normal exhaust gas pipe or the heat exchanger is perfused. As an example, upon starting up of a cold engine, the coolant will be heated in order to quickly warm up the engine to operating temperature. It would be advantageous to arrange a coiling heat exchanger around a straight pipe which corresponds to the diameter of the exhaust gas pipe that is employed. The heat exchanger core is connected on both sides with inlet and outlet funnels which lead into the employed exhaust gas pipe. Two gas flow paths result from this. On the one hand, through the inner exhaust gas pipe and, on the other hand, through the outer, fin equipped, coiled cross section. The flow of the quantity of exhaust gas is switched by a valve, which, when in the closed state, deviates the flow of exhaust gas in the bypass through the fin-equipped cross section.

Various advantageous effects are achieved through the invention. Firstly, the available round cross section can optimally be exploited for the heat exchange task. The heat exchanger performance is improved and the loss in pressure of such a heat exchanger is minimal. Moreover, the use of material can be reduced while maintaining the same cooling performance, which also saves resources during manufacturing. A lighter weight can be achieved, which reduces the weight of the vehicle and thereby movable mass which leads to savings on fuel and emissions. Not to be forgotten, cost savings result from the assembly of the components from fewer parts and, more particularly, from fewer different parts and the need for a smaller assembly space due the possibility of employing a smaller cooler having the same cooling performance.

DESCRIPTION OF THE DRAWINGS

Further details, features and advantages of embodiments of the invention result from the following description of embodiment examples with reference to the corresponding figures. These show:

FIG. 4A: A liquid shield in a still uncoiled state, FIG. 4B: A liquid shield with pre-punched areas that are arranged transversely to the coiling direction, FIG. 4C: The liquid shield in longitudinal section, FIG. 4D: The liquid shield in longitudinal section in detail, FIG. 5A: A bypass heat exchanger for an exhaust gas heat exchanger recovery system in longitudinal section with closed valve, FIG. 5B: A bypass heat exchanger with opened valve, FIG. 6A: A bypass heat exchanger in perspective representation with insertion in the exhaust gas pipe, and FIG. 6B: A heat exchanger spiral and cylinder-shaped flow-through cross section on the inside of a bypass heat exchanger.

DETAILED DESCRIPTION

Figure 1:
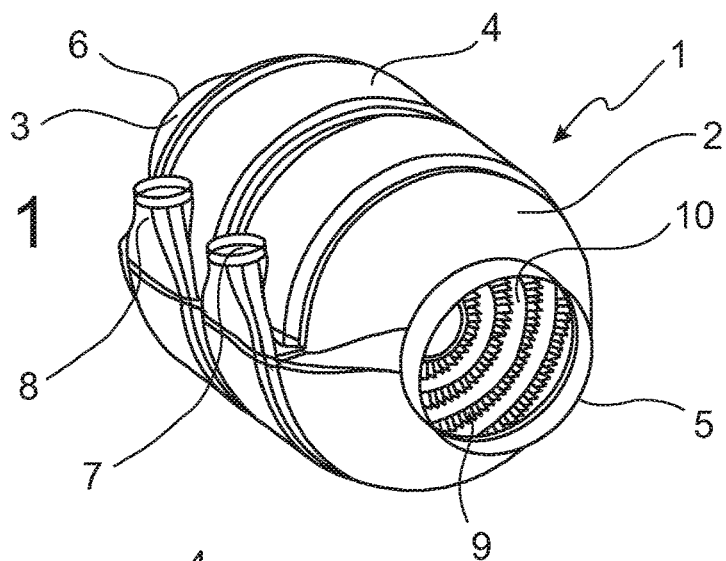
FIG. 1: A coiling heat exchanger in a perspective view.

In FIG. 1, an exhaust gas heat exchanger 1 is represented in perspective view. The exhaust gas heat exchanger 1 essentially consists of a heat exchanger spiral 4 that is connected with an inlet funnel 2 on the one side and with an outlet funnel 3 on the other side in the flow direction of the gas. A gas inlet 5 is at the end of the inlet funnel 2 and on the end at the opposing side you have the outlet funnel 3 which correspondingly ends in the gas outlet 6 of the exhaust gas heat exchanger 1. The heat exchanger spiral 4 goes over an outside on the terminal end in a liquid inlet 7 and a liquid outlet 8. In the perspective representation, looking in through the gas inlet 5, one can see the cross section of the heat exchanger spiral 4, indicated through recognizable ribs or fins 9, which are arranged between the spiral shaped coils of a liquid shield 10 and the spaced out spiral shaped coils.

Figure 2:
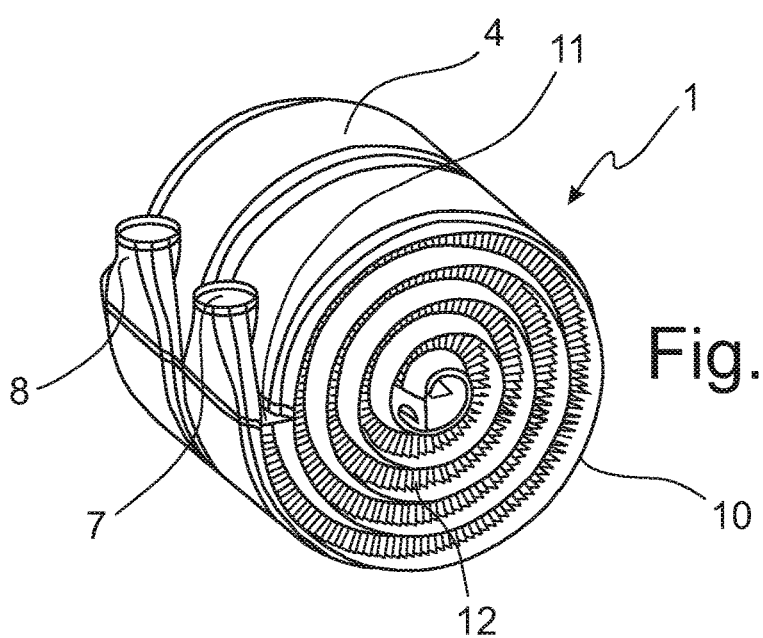
FIG. 2: A heat exchanger spiral of an exhaust gas heat exchanger configured as a coiling heat exchanger.

The heat exchanger spiral 4 of the exhaust gas heat exchanger 1, without the limiting inlet and outlet connection pieces 2, 3 for the gas is represented in FIG. 2, whereby in this view the cross section of the heat exchanger spiral 4 is recognizable in detail. In the embodiment shown, the fins 9 are executed as finned sheet metal 12, which are arranged on one side of the liquid shield 10 and are coiled up with it. At its end, the liquid inlet 7 is executed in a tube shape for connection to the coolant system, as is also the liquid outlet 8. A cover plate 11 limits the gas flow chamber on the outside of the perimeter end of the spiral 4.

Figure 3:
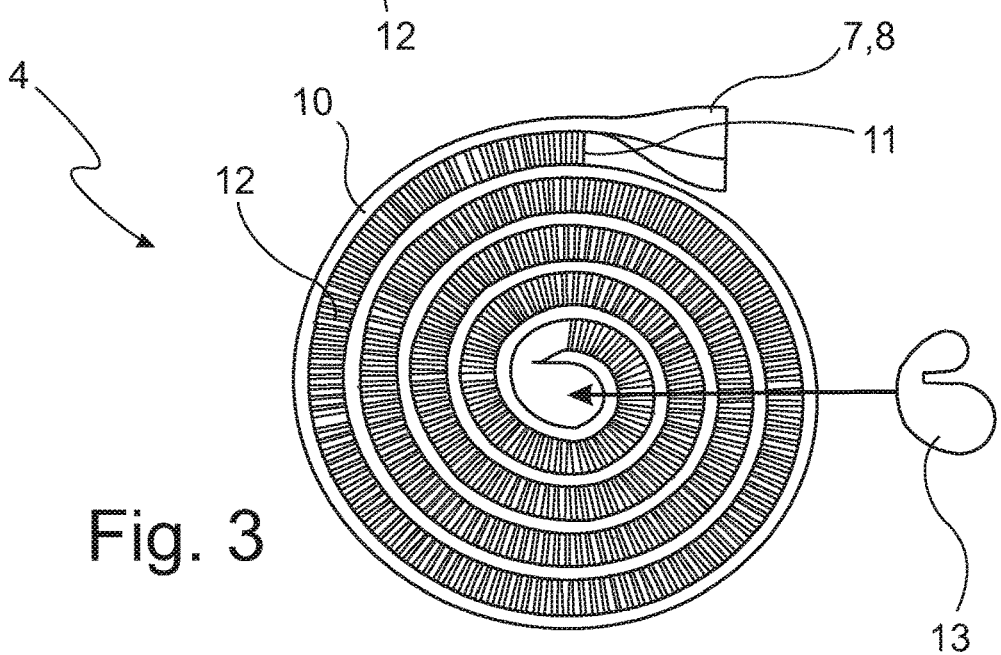
FIG. 3: The cross section of a heat exchanger spiral in the direction of the gas throughput.

The cross section of the heat exchanger spiral 4 is represented in FIG. 3. As a consequence, the liquid inlet 7 and the liquid outlet 8 are on one plane. The cover plate 11 limits the flow chamber for the gas on the outer perimeter of the heat exchanger spiral 4. The finned sheet metal 12 is connected in a heat conducting manner with the liquid shield 10, whereby the other end of the fin 9 is thermally contacted with the next coil of the spiral 4 on the other side of the liquid shield 10.

At the origin of the spiral 4, there is a central area that is laid out for technical/manufacturing reasons without finned sheet metal 12, which would bring about a short circuit flow of the gas without perfusion of the ribs 9. A sealing cap 13 is foreseen to prevent this, which seals this cross section for the gas, in such a way that the gas is forced to flow between the coils of the liquid shield 10 through the fins or fins 9 of the finned sheet metal 12.

A liquid shield 10 is represented in FIG. 4A in a rolled up state. In the embodiment shown, the liquid flow path 14 is laid out along the longitudinal direction of the rectangular development of the liquid shield 10 from the liquid inlet 7 all the way to a redirect area 25 and back to the liquid outlet 8. The flow area from the inlet 7 to the redirect area 25 and the flow area from the redirect area 25 to the outlet 8 thereby run parallel to one another and in opposing directions.

The liquid shield 10 with pre-punched areas 15 on the upper side are represented in FIG. 4B. The pre-punched areas 15 are laid out transversely to a roll-up direction 16 represented in FIG. 4C and reserve lengths of the top side of the corresponding pre-punched sheet metal result from the pre-punched areas 15.

The roll-up direction 16 is indicated with an arrow in FIG. 4C. The coiling of the heat exchanger spiral takes place from the end opposite the liquid inlet 7 and the liquid outlet 8.

In FIG. 4D the liquid shield 10 is represented in an enlarged manner in the area of the liquid inlet 7 and the liquid outlet 8. The assembly of the liquid shield 10 from a top metal sheet 17 and a bottom metal sheet 18 is recognizable in detail in this embodiment. The lower metal sheet 18 is arranged in a neutral bending plane 19 and connected on the lower side with the finned sheet metal 12 with the fins 9. The top metal sheet 17, which is outside the bending plane, is provided with the pre-punched areas 15, which create a reserve length for the coiling operation. Through the provision of the pre-punched areas 15, an elongation in the peripheral direction of the top metal sheet 17 occurs in such a way that the reserve length of the pre-punched area 15 is released during the coiling operation and it does not come to a material weakening through an elongation of the top metal sheet 17. The flow path is laid out in the intermediate space between the top metal sheet 17 and the lower metal sheet 18.

An embodiment of the coiling heat exchanger as a bypass heat exchanger 20 for an exhaust gas heat recovery system is represented in FIG. 5A, whereby FIG. 5A shows a longitudinal section of the bypass heat exchanger 20 with a closed valve 23. The bypass heat exchanger 20 is essentially made up of a heat exchanger spiral 4 that is limited for the gas from an inlet funnel 2 and an outlet funnel 3. As is shown, the heat exchanger spiral 4 features a liquid inlet 7 and a liquid outlet 8. The liquid shield 10 of the heat exchanger spiral 4 with the fins 9 is however not spiral-shaped all the way to the origin in the center, but rather the spiral 4 forms a cylinder-shaped flow-through cross section 26 in its center. The cylinder-shaped flow-through cross-section 26 is laid out with a valve 23 that can seal it, in such a manner that when the inner flow-through cross section 26 is sealed, a gas flow path 21 flows through the intermediate spaces of the coils of the liquid shield 10 and as a consequence around the fins 9 and comes into thermal contact with the coolant of the liquid shield 10. The inlet funnel 2 and the outlet funnel 3 are respectively attached to an exhaust gas pipe 22 and the inside of the cylinder-shaped flow-through cross section 26 is executed in the same dimension as the flow-through cross section of the exhaust gas pipe 22.

The bypass heat exchanger 20 is represented in FIG. 5B with the valve 23 in open position, so that the gas flow path 21 preferentially perfuses the cylinder-shaped flow-through cross section 26, inasmuch as the same triggers a more limited loss in pressure when compared to the perfusion of the coiling intermediate spaces with perfusion of the fins 9. A typical application for the bypass heat exchanger 20 in the operational setting according to FIG. 5A is the warm-up phase of an engine at the start of operation. The heat from the exhaust gas flow is absorbed by the coolant circulation circuit and is transferred to the engine so as to bring the engine as quickly as possible to operational temperature. During ongoing operation, upon reaching operational temperature, the central cylinder-shaped flow-through cross section 26 is unblocked through the opening of the valve 23 according to FIG. 5B and the coolant circuit is no longer heated.

A bypass heat exchanger 20 is shown in FIG. 6A in perspective view, whereby the involvement of the bypass heat exchanger 20 in the exhaust gas pipe 22 to the two sides of the heat exchanger spiral 4 is represented. The valve 23 is indicated schematically as being arranged in the area of the gas inlet in the bypass heat exchanger 20.

The heat exchanger spiral 4 is separately represented from a perspective point of view in FIG. 6B and the cylinder-shaped flow-through cross section 26 is constructively executed through a limitation of the system connectors 24 for the valve 23, to enable an effective seal of the cylinder-shaped flow-through cross section 26 by means of the valve 23. In the case of a closed cylinder-shaped flow-through cross section 26, the flow of the gas occurs through the fins 9, whereby the exhaust gas transfers the heat to the liquid circuit. The heat exchanger spiral 4 is integrated in the engine cooling circuit of the vehicle through the liquid inlet 7 and the liquid outlet 8.

REFERENCE INDEX

1 Exhaust gas heat exchanger
2 Inlet funnel
3 Outlet funnel
4 Heat exchanger spiral
5 Gas inlet
6 Gas outlet
7 Liquid inlet
8 Liquid outlet
9 Ribs, Fins
10 Liquid shield
11 Cover plate
12 Finned sheet metal 13 Sealing cap
14 Liquid flow path
15 Pre-punched area
16 Roll-up direction
17 Upper sheet metal
18 Lower sheet metal
19 Neutral bending plane
20 Bypass heat exchanger
21 Gas flow path
22 Exhaust gas pipe
23 Valve
24 System connector
25 Redirect area
26 Cylinder-shaped flow-through cross section

What is claimed is:

1. A coiling heat exchanger comprising:
   a heat exchanger spiral further comprising:
     a liquid shield with fins, whereby neighboring coils of a spiral of the liquid shield are spaced apart by the fins and connected in a heat exchanging manner, wherein the liquid shield is perfused by a liquid, and wherein a gas flows between the neighboring coils of the spiral of the liquid shield along an axis of the coils; and
     a sealing cap sealing an area of a central origin of the spiral not including the fins, the sealing cap preventing a short circuit flow through the area of the central origin.

2. The coiling heat exchanger according to claim 1, wherein the liquid shield further comprises a top metal sheet and a bottom metal sheet, the top metal sheet and the bottom metal sheet attached to one another at least in edge areas.

3. The coiling heat exchanger according to claim 1, wherein the fins are formed on only one side of the liquid shield.

4. The coiling heat exchanger according to claim 1, wherein the fins are formed as finned sheet metal, wherein the finned sheet metal is connected in a heat conducting manner with at least one side of the liquid shield.

5. The coiling heat exchanger according to claim 1, wherein the liquid shield further comprises a liquid inlet and a liquid outlet, wherein a liquid flow path is formed between the liquid inlet and the liquid outlet and progresses inwards in a spiral shape, and following a redirect, the liquid flow path once again flows outwards in a spiral shape.

6. The coiling heat exchanger according to claim 5, wherein the liquid inlet and the liquid outlet are arranged on a first side of the liquid shield and a redirect area is arranged on a second side of the liquid shield, and wherein the liquid flow path is laid out in a neighboring manner and in an opposing direction.

7. The coiling heat exchanger according to claim 1, wherein the liquid shield includes pre-punched areas on at least one side beyond a bending plane which creates a reserve length for a coiling of the heat exchanger spiral.

8. The coiling heat exchanger according to claim 1, wherein the heat exchanger spiral is an Archimedes spiral that starts with the central origin.

9. The coiling heat exchanger according to claim 1, wherein the coiling heat exchanger is an exhaust gas heat exchanger configured for use in an internal combustion engine for a motor vehicle.

10. A method for manufacture of a coiling heat exchanger comprising steps of:
    coiling a rectangular liquid shield around a first side in a roll-up direction along the first side, wherein the first side of the liquid shield lays in a bending plane and a second side of the liquid shield lays beyond the bending plane, and the second side of the liquid shield is elongated and a reserve length of a pre-punched area is released by the coiling step; and
    providing a sealing cap sealing an area of a central origin of a heat exchanger spiral created during the coiling step, the sealing cap preventing a short circuit flow through the area of the central origin of the coiling heat exchanger.

* * * * *